UNITED STATES PATENT OFFICE.

ADOLPH JOHANNSEN, OF FLENSBURG, GERMANY.

CEMENT FOR SHIPS' BOTTOMS.

SPECIFICATION forming part of Letters Patent No. 669,993, dated March 19, 1901.

Application filed August 4, 1900. Serial No. 25,894. (No specimens.)

*To all whom it may concern:*

Be it known that I, ADOLPH JOHANNSEN, a subject of the Emperor of Germany, residing at Stiftstrasse No. 9, Flensburg, Germany, have invented certain new and useful Improvements in Cement for Ships' Bottoms; and I do hereby declare the following to be a full, clear, and exact description of the invention, such as will enable others skilled in the art to which it appertains to make and use the same.

It is well known that the coating of ships' bottoms with a mixture of sand and cement is very heavy, and in order to reduce the weight of the mass employed for cementing the ships' bottoms the cement has been mixed with powdered coke and powdered brick or other similar material; but this mixture has proved to be insufficient, as it is very porous, and, on the other hand, brittle, so that the slightest concussions or trepidations produce cracks and seams.

The present invention is adapted to prevent this inconvenience, and has for its object to produce a coating for ships' bottoms of less weight than a mass which is made of cement and sand and being more resistant, and thus more useful. In order to obtain this object in view, I add to a mixture of cement and coke a certain quantity of fine chalk and sawdust.

The approximate proportions of the several ingredients are as follows: cement, forty-five parts, by weight; coke, thirty-five parts, by weight; finely-pulverized chalk, fifteen parts, and fine sawdust five parts. These ingredients are thoroughly commingled, and then water is added in sufficient quantity to make up an ordinary mortar, whereupon the coating can be applied and is allowed to harden on the surface of the bottoms of ships. The weight of such a coating is reduced to almost one-half of the weight of the ordinary material made up from cement and sand.

The addition of chalk and sawdust produces the result that even the smallest pores of the coke are completely filled and that thus a dense mass is obtained. Practical experience has shown that the adhesion to the ships' surfaces of the material above described is considerably increased.

I claim—

As an article of manufacture, a mixture for coating ships' bottoms, composed of ordinary cement, (such as Portland or Roman) and pulverized coke to which an addition of finely-pulverized chalk and fine sawdust is made, substantially in the proportions above described.

In testimony whereof I affix my signature in presence of two witnesses.

ADOLPH JOHANNSEN.

Witnesses:
J. HERMES,
H. H. CLASEN.